UNITED STATES PATENT OFFICE.

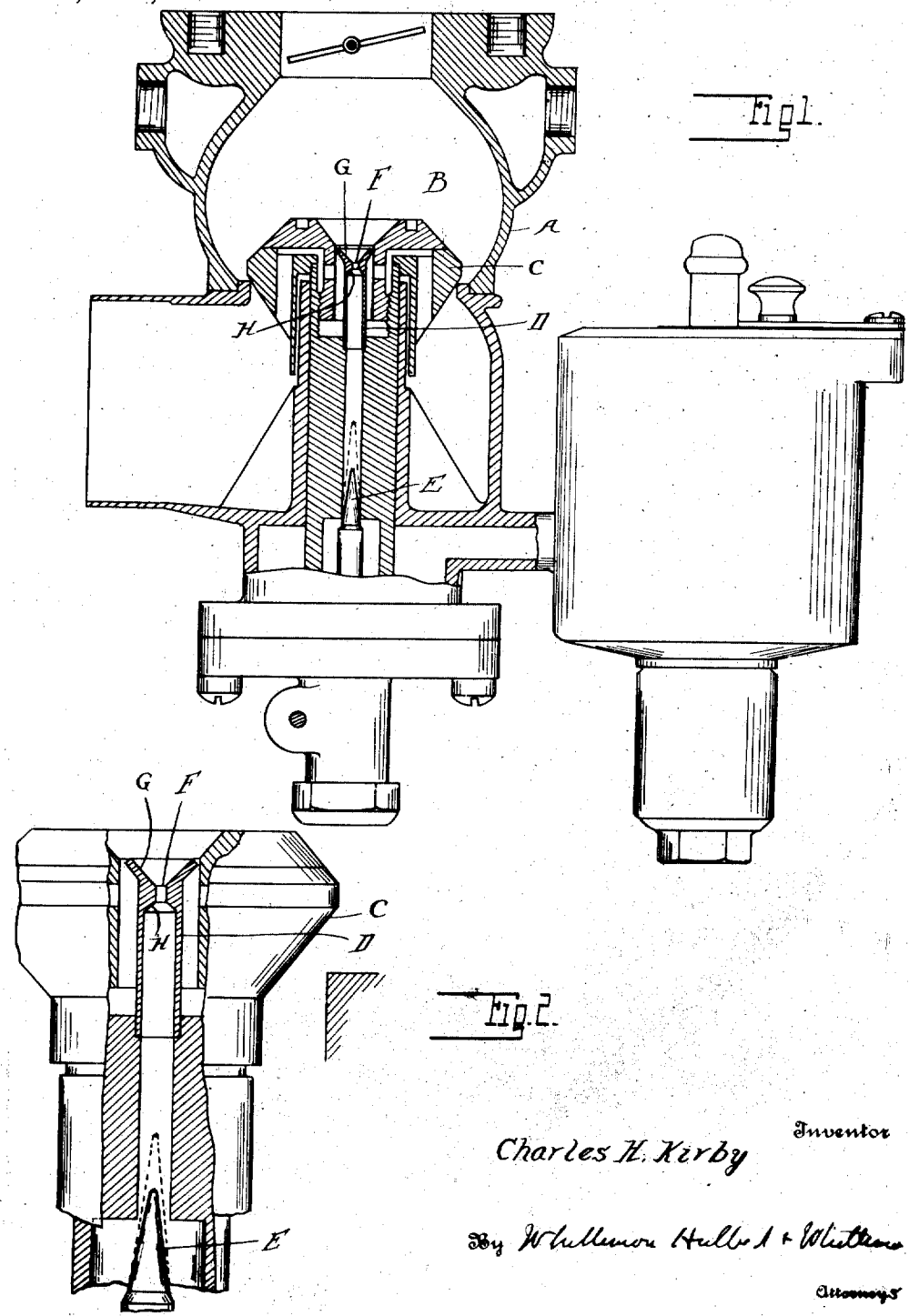

CHARLES H. KIRBY, OF DETROIT, MICHIGAN, ASSIGNOR TO DETROIT LUBRICATOR COMPANY, OF DETROIT, MICHIGAN, A CORPORATION OF MICHIGAN.

CARBURETER.

1,213,209.      Specification of Letters Patent.      Patented Jan. 23, 1917.

Application filed September 23, 1915. Serial No. 52,284.

*To all whom it may concern:*

Be it known that I, CHARLES H. KIRBY, a citizen of the United States of America, residing at Detroit, in the county of Wayne and State of Michigan, have invented certain new and useful Improvements in Carbureters, of which the following is a specification, reference being had therein to the accompanying drawings.

The invention relates to carbureters of that type in which the liquid fuel is metered by means automatically controlled by the velocity of the air current in which the liquid is discharged. With such constructions it is usual to provide an automatically-operating air valve containing an oil discharge nozzle or aspirating tube, and a coöperating metering pin, which varies the area of opening with each position of adjustment of the valve. Where a metering pin with a uniform taper is used, the area of opening increases with the movement of the valve, but it has been found that this does not produce a proportional discharge of the liquid, for the reason that the viscosity of the latter retards its flow through a small area. Thus the practical effect is to produce too lean a mixture at low speeds and too rich a mixture at high speed.

It is the object of the present invention to avoid this defect and to accomplish the result without the necessity of curving or changing the angle of the metering pin, which is not practical in manufacturing. To this end I have provided the usual metering pin with the straight taper designed to properly proportion the discharge of liquid at low speeds, and have associated therewith additional means for restricting the flow of liquid at high speeds.

In the drawings: Figure 1 is a central section through a portion of a carbureter embodying my invention; and Fig. 2 is an enlarged view of the oil discharge nozzle.

A is the casing containing the mixing chamber B, having its admission port controlled by an automatic valve C. This valve is provided with an aspirating tube D, which coöperates with a metering pin E to vary the area of opening for the oil proportional to the movement of the valve. The construction is such that variations in the position of the valve C will produce a proportionate mixture of oil and the liquid when the engine is running at low or moderate speed.

With the construction as thus far described, when the engine is running at relatively high speed there will be a disproportionate discharge of the liquid producing an over-rich mixture. I have therefore provided an additional means of restricting the flow, comprising a restricted orifice F, preferably at the upper end of the aspirating tube, and of such an area as to limit the maximum discharge of liquid therethrough to correspond to the maximum flow of air. Above and below this restriction the tube is preferably flared, as indicated at G and H, so as to avoid the forming of eddies.

In operation, when the engine is running at low speed the area of the restriction F is greater than the opening controlled by the metering pin, and consequently has no effect in restricting the flow. As the speed increases, however, the restriction imposed by the port F is increased, thereby maintaining a substantially proportionate discharge throughout the entire range of adjustment.

What I claim as my invention is:—

1. In a carbureter, the combination with an automatic air valve, an aspirating tube carried thereby and a coöperating metering pin for variably restricting the discharge of liquid through said aspirating tube, of auxiliary non-adjustable means for restricting the flow of liquid proportioned to be relatively inoperative at low velocities of the air and increasingly operative at high velocities.

2. In a carbureter, the combination with an automatic air valve, an aspirating tube carried thereby and a coöperating metering pin for varying the area of inlet opening to said tube in different positions of adjustment of the valve, of a restriction in said aspirating tube proportioned to limit the maximum discharge of liquid and to be relatively inoperative at restricted positions of adjustment of said metering pin.

3. In a carbureter, the combination with an automatic air valve, an aspirating tube carried thereby and a coöperating metering pin for varying the inlet of the liquid fuel, of a restriction located at the discharge mouth of said aspirating tube proportioned to limit the maximum discharge of liquid.

4. In a carbureter, the combination with an automatic air valve, of an aspirating tube and coöperating metering pin one of which is controlled by said valve, said tube having a restriction at one point and being flared at each side of the restriction.

5. In a carbureter, the combination with an automatic air valve, of an aspirating tube and coöperating metering pin one of which is controlled by said valve, said tube having a restriction located at the discharge mouth thereof proportioned to limit the maximum discharge of liquid.

In testimony whereof I affix my signature in presence of two witnesses.

CHARLES H. KIRBY.

Witnesses:
JAMES P. BARRY,
PHYLLIS COBURN.